C. F. COLBERT.
FILING MACHINE.
APPLICATION FILED JAN. 3, 1911.

1,072,428.

Patented Sept. 9, 1913.
10 SHEETS—SHEET 7.

C. F. COLBERT.
FILLING MACHINE.
APPLICATION FILED JAN. 3, 1911.

1,072,428.

Patented Sept. 9, 1913.
10 SHEETS—SHEET 9.

UNITED STATES PATENT OFFICE.

CLARENCE F. COLBERT, OF HOOPESTON, ILLINOIS.

FILLING-MACHINE.

1,072,428. Specification of Letters Patent. Patented Sept. 9, 1913.

Application filed January 3, 1911. Serial No. 600,652.

*To all whom it may concern:*

Be it known that I, CLARENCE F. COLBERT, a resident of Hoopeston, in the county of Vermilion and State of Illinois, have invented certain new and useful Improvements in Filling-Machines, of which the following is a full, clear, and exact description.

The invention relates to filling machines, and more particularly to that type, which is adapted for filling cans with fruit or vegetables.

One object of the invention is to provide an improved machine which is capable of handling large quantities of material, as desired in canneries where large quantities of fruit or vegetables are to be packed in a short period of time and as fast as the fruit or vegetables are prepared for packing.

The invention also designs to provide an improved machine which is adapted to handle fruit or vegetables and which may be continuously operated and in which the bulk material is automatically measured and delivered to the hoppers from which the material is forced into the cans or packages.

The invention further designs to provide an improved filling machine, in which there is a series of hoppers and associated mechanisms, each adapted to fill a can, so that the hoppers may be filled in rapid succession, and so that as soon as one hopper has been filled, the next hopper may be brought into position to receive a charge of material, the discharging operation from one hopper occurring, while another is being filled, to make it possible to fill cans at a rapid rate.

The invention further designs to provide an improved filling machine, which is provided with a rotating table upon which the cans are delivered and upon which the cans will be successively filled and then discharged therefrom as the table rotates, so that the filling operations will be facilitated and the different steps of the filling operations will be performed as the cans are moved around on the table.

The invention further designs to provide improved mechanism for delivering measured charges of material to the hoppers from which the material is discharged into the cans or receptacles, and to improve the construction and operation of filling machines adapted for fruit or vegetables and like material.

The invention consists in the several novel features hereinafter set forth and more particularly defined by claim at the conclusion hereof.

In the drawings: Fig. 9ª is an elevation of the delivery mechanism from the inner side thereof, the main frame and delivery spout being shown in section.

The several mechanisms of the machine are mounted upon a suitable frame A, which has a chamber therein for inclosing some of the operating-mechanism and has a top $a$ which forms a bed or table. At one side of the machine and mounted upon the bed $a$ is a frame, on which is mounted mechanism B for delivering measured quantities of material to the hoppers as they are successively brought into position to receive a charge. Hoppers C (Fig. 1) are mounted on a rotatable table D, which is mounted in the bed $a$ of the frame A, as hereinafter more fully set forth. These hoppers are rotated with the table to successively bring them into position to receive a charge of material from the delivery-mechanism B. During rotation of the hoppers, after having received a charge of material from the delivery-mechanism, the charge is forced into cans beneath the hoppers by plungers and the cans are discharged from the table, and during each rotation of a hopper, it will receive a charge and the filling-operation will be completed, as hereinafter more fully set forth.

Figure 4:
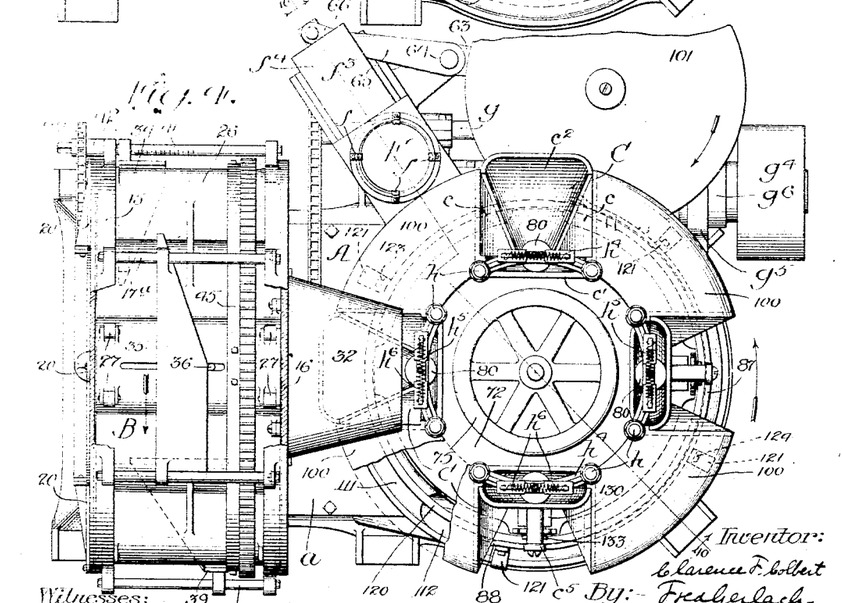
Fig. 4 is a plan.

The delivery-mechanism B (Figs. 1, 2, 4, 9, 11 and 12) comprises an outer ring 15 and an inner head 16 which are secured together by cross-rods 17ª, each of which is rigidly secured upon the bed a, as at 17. A stationary drum 18, having its inner end closed by a head 19, is secured by arms or spokes 20 to the outer stationary-ring 15. Drum 18 serves to receive material in bulk for filling the measuring-receptacles. The outer end of this drum has its upper portion provided with an opening 21 through which the material will be delivered into the drum. An inclined wall 22 is secured in the drum to direct the material, such as tomatoes, toward the inner end and bottom of the drum. The latter is cut away, as at 23, to provide a discharge outlet for the material, which communicates with a series of rotating receptacles 24, which are mounted to rotate around the drum, and successively receiving material when they are beneath the opening 23. These receptacles are formed in a body 26 which fits around the stationary drum 18 and is extended to form laterally extending chambers 24 (four being shown) outside of the drum. This rotating body is provided with rollers 27 which are adapted to travel on inwardly extending flanges of supporting-ring 15 and head 16. In each receptacle 24, is fitted a plunger 28 which is adapted to slide longitudinally therein, to compress the material in the receptacle and to discharge it therefrom. The inner ends of receptacle 24 are closed by a face-plate 30, which is secured to head 16 and the upper portion of this plate is provided with a discharge-opening 31, through which the material in the receptacles will be successively discharged into a stationary spout 32, which delivers the material into the hoppers C as the receptacles are rotated. When a receptacle 24 is in its lowered position, its plunger 28 will be positioned near the outer end of the receptacle (Fig. 11) so that the material from the drum 18 will pass through opening 23 into that receptacle and fill it. As the receptacles rotate from their lower position to the upper, the plungers are operated to compress the material therein and so that when they reach their highest position (Fig. 12) they will discharge the material from the receptacles into a spout 32, and as the receptacles rotate downwardly, they are shifted outwardly so that when they reach their lower position they will again be positioned to permit a full charge of material to pass into receptacle 24. A wall of drum 18 around discharge opening 23 is cut away to provide an inclined edge or knife 33, which cuts off any material projecting from the receptacle into the drum, after the material has been compressed, so that a uniform and measured quantity will be delivered by each receptacle 24 into the spout 32. The capacity of each receptacle 24, with its plunger 28 in its outer position, is greater than necessary for a charge of material and the plungers are successively operated inwardly by a cam 34 to compress the material in the receptacles 24, before the latter have passed above the upper end of discharge opening 23 in drum 18, so that in each instance a full charge is insured by compression of the material, the excess being forced back into the drum, and knife 33 serving to sever the material in the receptacles from that in the drum, as the receptacle rotates. A stationary cam 35 (Fig. 4) has an inclined edge which is engaged by the pins 36 on the plungers 28, after the excess material has been severed and the receptacles have passed above discharge opening 23, to shift the plungers inwardly sufficiently to eject all of the material in the receptacles into spout 32, for delivery into the hoppers C. A cam 39 (Fig. 2) is secured to rods 17ª and has an inclined edge which is adapted to be engaged by the studs 36 on plungers 28 to shift the plungers outwardly after the material has been ejected from receptacles 24. Cam 34 is adjustably mounted on screw-threaded rods 41 and by adjusting this cam inwardly or outwardly, the amount of material remaining in the receptacles 24 may be varied. If it is desired to fill one pound cans with material, the cam 34 will be adjusted inwardly so that a corresponding quantity of material will remain in each receptacle 24 as it leaves the opening 23 of the drum, and if it is desired to fill two pound cans, the cam will be adjusted outwardly so that a corresponding quantity of material will remain in each receptacle after communication between each chamber 24 and the chamber in drum 18 has been cut off.

For convenience in conjointly adjusting screw-rods 41 and adjustable cam 34, a sprocket-wheel 42 is secured to the outer ends of each of said rods and these wheels are connected by a chain 43 by applying a crank to a squared end 44 of the upper end of rod 41 (Fig. 9), the cam may be readily adjusted to vary the compression-stroke of the plungers, and the quantity delivered by each into the spout 32.

Figure 5:
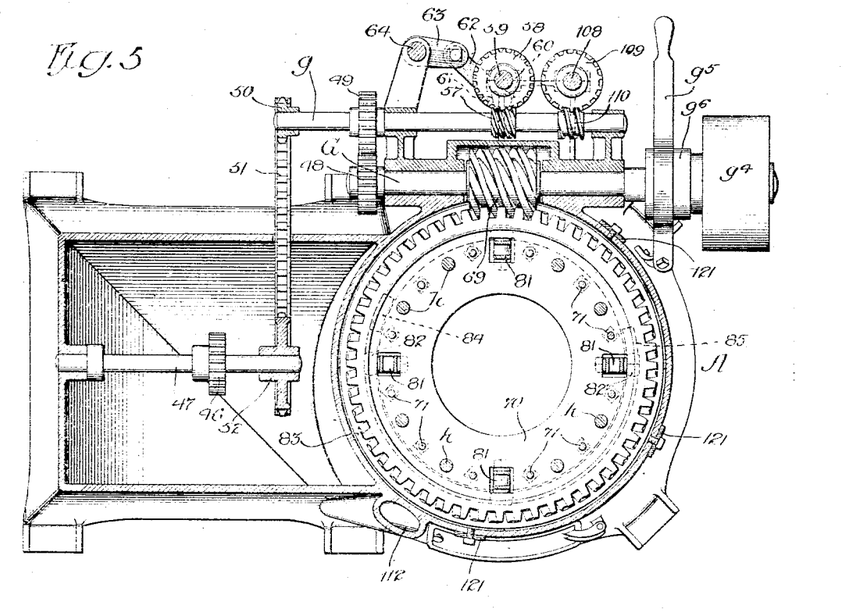
Fig. 5 is a horizontal section on line 5—5 of Fig. 1.
Figure 6:
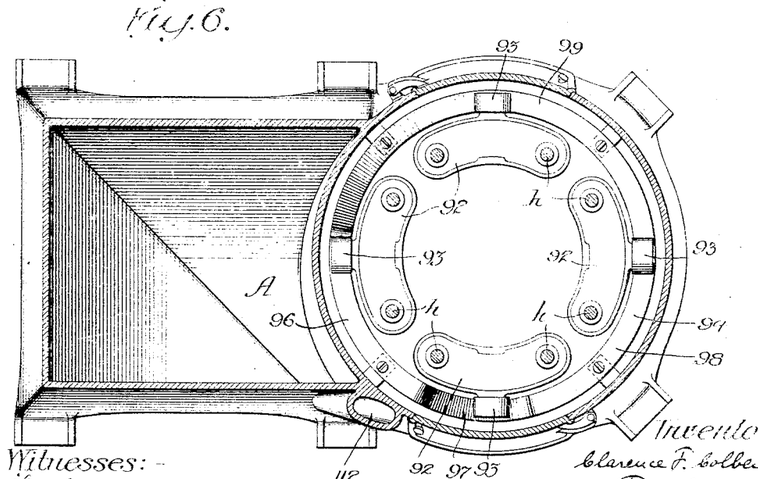
Fig. 6 is a horizontal section on line 6—6 of Fig. 2.
Figure 11:
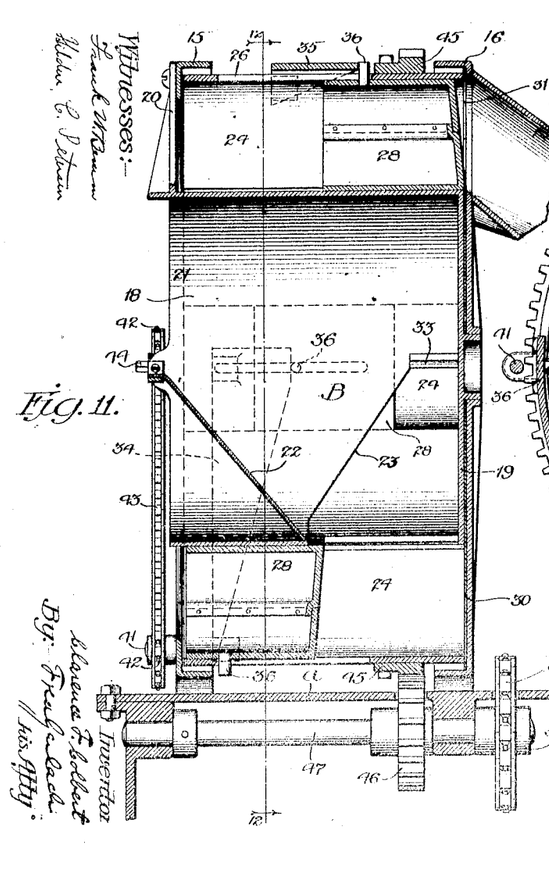
Fig. 11 is a central vertical section through the mechanism for delivering material to the hoppers.
Figure 12:
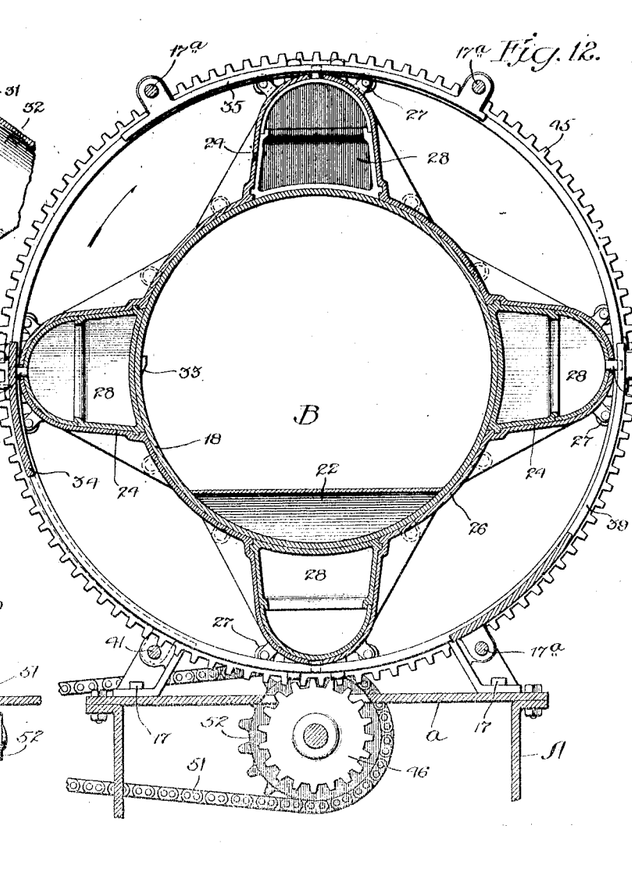
Fig. 12 is a section taken on line 12—12 of Fig. 11.

Receptacles 24 are continuously driven by a gear-ring 45, the teeth of which mesh with a gear-wheel 46 (Figs. 11 and 12) on a shaft 47 which is journaled beneath the bed a (Fig. 11). Said shaft is driven from the main drive-shaft G (Fig. 5) by a gear-wheel 48 on said shaft which meshes with a gear-wheel 49 on a counter-shaft $g$, which drives the shaft 47 of the delivery-mechanism by a sprocket-wheel 50 on the counter-shaft $g$ and a chain 51 which drives a sprocket-wheel 52 on the shaft 47.

The operation of the delivery-mechanism will be as follows: The material, such as tomatoes, in bulk, will be delivered by suitable means, usually a conveyer, into the stationary drum or receptacle 18 and the gear-mechanism last described will impart a continuous rotary movement to the body 26 and receptacles 24. As each of these receptacles successively reach the lowest position beneath the drum, the material from the drum 18 will fall into and fill them. As the receptacles travel upwardly, adjustable cam 34 will engage studs 36 on plungers 28 and compress the material therein before the receptacle clears the discharge-opening 23 in drum 18, so that the excess material will be forced back into the body of the drum and the projecting material will be cut off by the knife 33 and so that a compressed uniform quantity of material will be contained in the receptacle after communication with the drum has been cut off. Thereafter, each receptacle will move upwardly and cam 35 will engage stud 36 of the plunger 38 as the open inner end of the receptacle comes opposite the spout 32 and will move the plunger inwardly to eject the compressed charge into the spout 32 from which it will be delivered into the hoppers as hereinafter set forth. After the material has been ejected and while each receptacle is moving downwardly, its plunger 28 will be shifted outwardly by cam 39 so that when each receptacle passes into position to receive a charge of material, its plunger will be in its outermost position. This delivery-mechanism is driven to correspond with the operation of the hoppers so that a charge will be delivered into each of the hoppers C, as they rotate beneath the spout 32. By adjustment of cam 34, the quantity of material delivered into the hopper may be regulated or varied, so that the said mechanism will be adapted for delivering charges for filling different sized cans or receptacles.

The machine comprises a rotating table D on which the cans to be filled are successively fed beneath the hoppers through which the material is forced into the cans, the hoppers receiving the material from the delivery mechanism B and after the hoppers are charged, plungers H are operated to force the material in to the cans, while the table rotates and after the cans have been filled they are successively removed from the table, thus making it possible to continuously and rapidly operate the machine.

Figure 1:
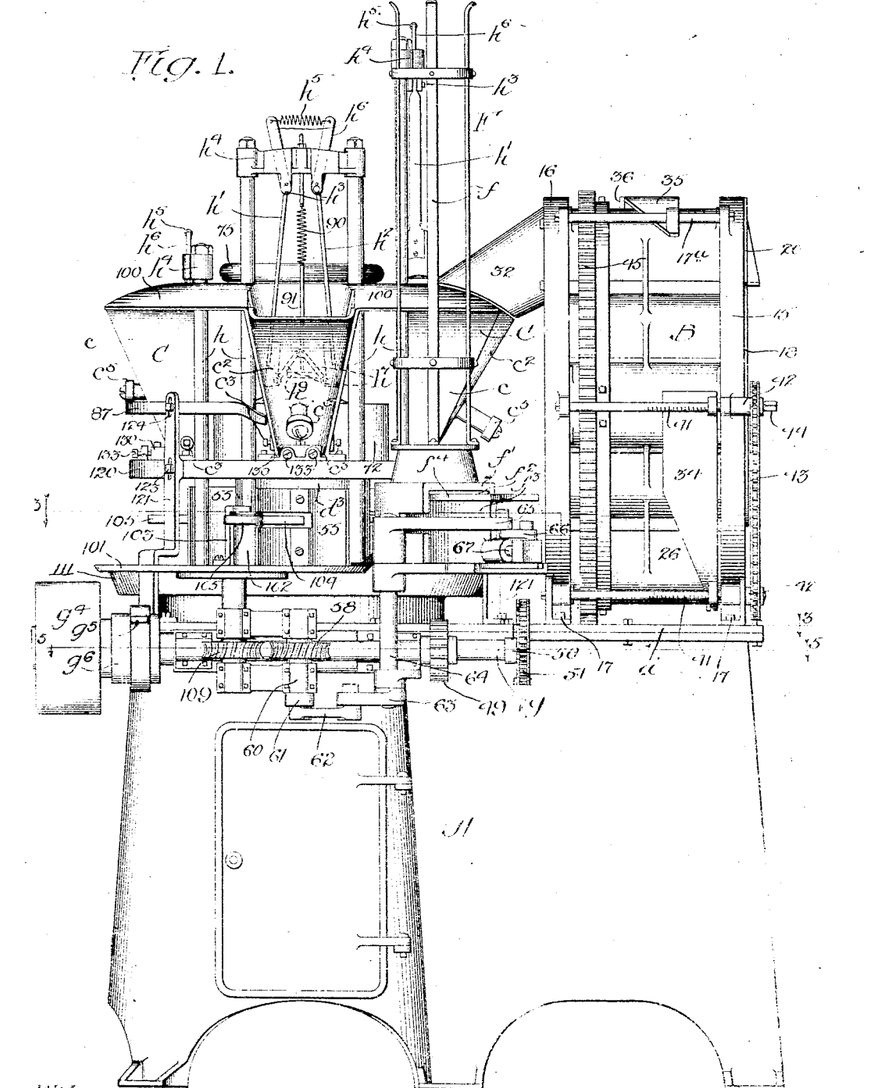
Figure 1 is a side elevation of a machine embodying the invention.
Figure 2:
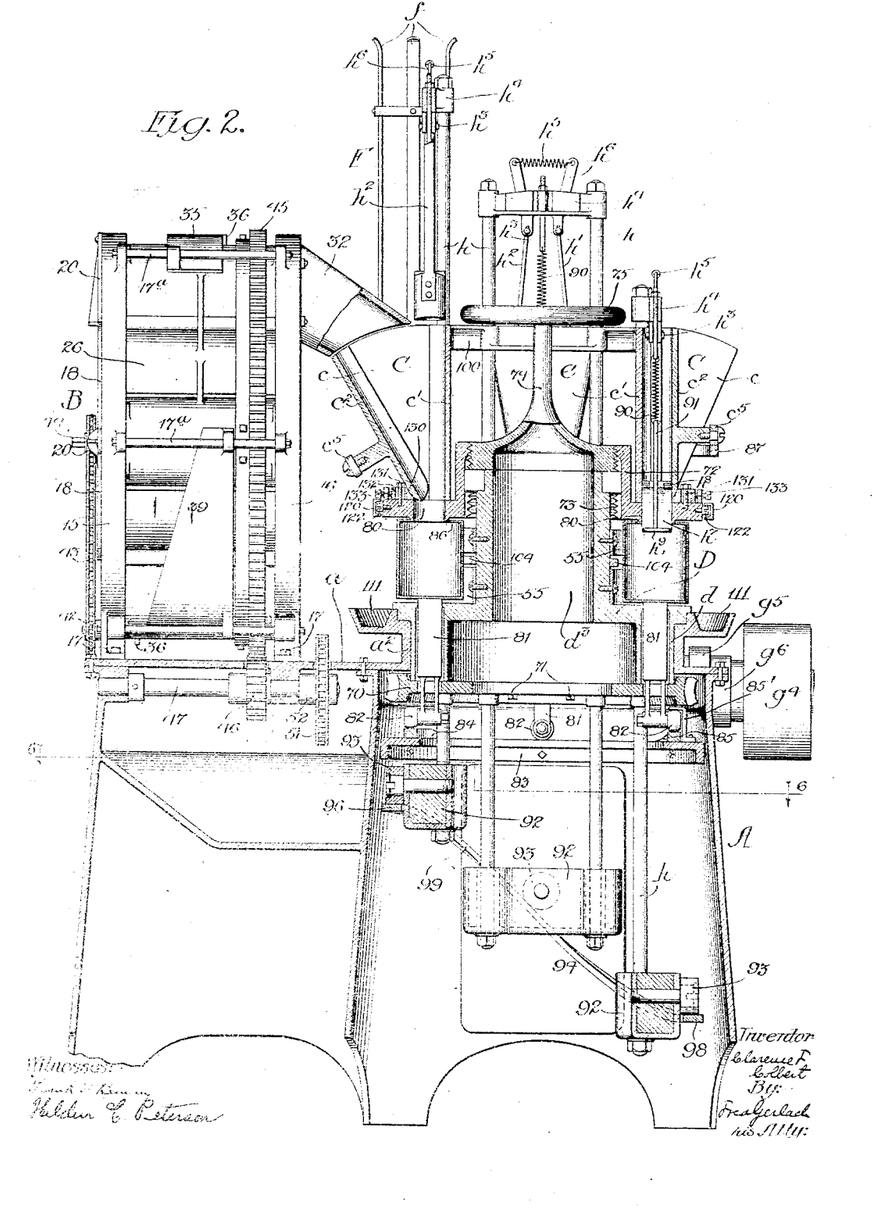
Fig. 2 is a central longitudinal section, the mechanism for measuring and delivering the material to the hoppers being shown in elevation.
Figure 3:
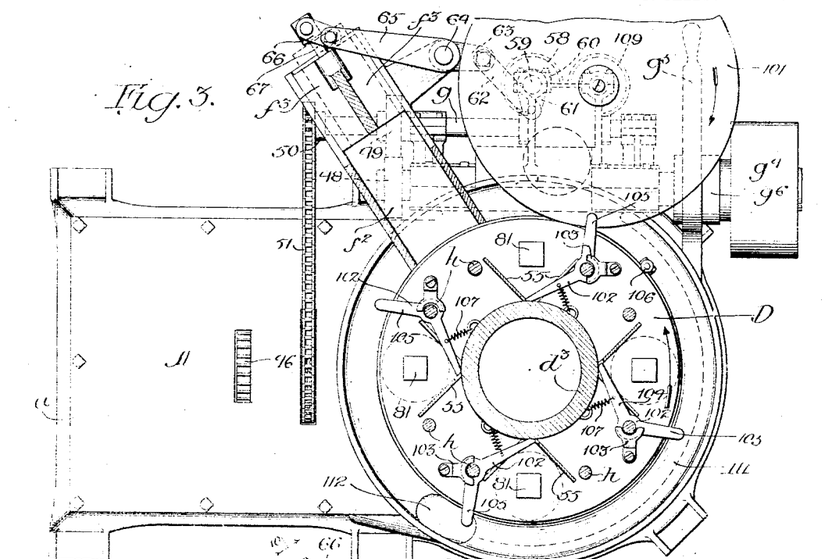
Fig. 3 is a horizontal section taken on line 3—3 of Fig. 1.

For the purpose of feeding cans onto the rotating table and into position beneath the hoppers, a guide F is provided for holding a stack of cans (Figs. 1 and 3). This guide consists of a series of strips $f$ secured at their lower ends to a base $f'$, in which a channel $f^2$ is formed, for a reciprocating plunger $f^3$ and the cans. The latter are fed individually upon the rotating table D by a plunger $f^3$ (Figs. 1, 3 and 4), each operation of the plunger causing the lowermost can of the stack in guide F to be fed onto the table D. The table is provided with angular stops or guides 55 (Figs. 1, 2, 3 and 7) for accurately positioning or centralizing the cans beneath the hoppers and the operation of the plungers is timed to push a can against each of the guides or stops 55 as the latter rotate. The can-feeding plunger $f^3$ is provided with a top-wall $f^4$ which holds the stack of cans elevated, while the lowermost is being fed onto the table. This plunger is operated from the counter-shaft $g$, which is driven as hereinbefore described, by a worm-wheel 57 (Fig. 5) which meshes with a worm-gear 58 which is secured to a shaft 59 journaled in bearings 60 on the frame A. A crank 61 is secured to the lower end of shaft 59 and a link 62 connects said crank to an arm 63 on a vertically extending rock-shaft 64 which is suitably journaled on the main-frame and has an arm 65 secured to its upper end (Figs. 1 and 3), and a link 66 connects the distal end of said arm to a projecting stud 67 on plunger $f^3$. While the machine is being operated, said feed-mechanism will be operated to reciprocate the plunger $f^3$ and feed the lowermost can of the stack into position beneath one of the filling hoppers, one can to each hopper, so that the cans will be automatically fed from the stack, synchronously with the filling operations and so that the cans will be successively fed into position beneath the hoppers as the latter rotate with the table D.

Continuous rotary movement is imparted to table D by a worm-wheel 69 on the main drive-shaft G (Fig. 5) which meshes with a gear-ring 70 secured to the table D, by bolts 71. The table is formed with a downwardly extending annulus $d$, which is journaled in an annular vertical wall $a^2$ of the main frame A and the gear-ring 70 for rotating the table, is secured to the lower end of annulus $d$ and is disposed beneath the bed $a$ and within the main-frame A. The central portion of the rotatable table D is provided with an upwardly extending cylindrical shell $d^3$ to which the can-guides 55 are secured. The filling-hoppers are secured to rotate with the table and are vertically adjustable to adapt the machine for filling cans of different sizes. For this purpose, a hopper supporting-ring 72 is provided with an internal screw-thread 73 engaging an external thread on an adjuster 74 which rests on the top of shell $d^3$ of the rotating table and is provided with a hand-wheel 75 at its upper end, whereby it may be turned to raise or lower the hopper supporting-ring 72. The latter is secured to rotate with shell $d^3$ and the table D, by keys 76 which fit into vertical grooves or ways 77 (Figs. 2, 7 and 8) in ring 72, this mechanism serving to connect the supporting-ring to the table so it will rotate therewith and permit the ring to be raised or lowered by the operation of hand-wheel 74 to properly position the supporting-ring for cans of different sizes relatively to the rotatable table D onto which the cans are fed. The cans fed onto the table D, by the can-feeding mechanism, are firmly held in position, with the mouth of the cans beneath openings 80 in the bottom of each filling hopper, by slidable plungers 81 (Figs. 2 and 7), one being provided beneath each hopper. To the lower end of each plunger 81 is connected a roller 82 and these rollers are adapted to travel on a stationary track or ring 83 in the body A, this track being provided with cam surfaces 84 and 85 for respectively raising and lowering the plungers to raise the can against the hopper supporting ring 72, which is provided with depending ribs 86 around the discharge-openings 80 to enter the mouths of the cans. A cam 85' above cam 85 of track 83 forces rollers 82 downwardly in event gravity is insufficient to do so. As the cans are successively fed onto the table D, the plungers 81 beneath them, will be raised by cam 84 to hold the cans in position to receive a charge from the filling hoppers. After the cans have been filled, they will have passed around with the table, rollers 82 of plungers 81 will ride down cam 85 to successively release the cans.

In packaging vegetables or fruit, for example; tomatoes, it is desirable to force the material through the hopper and through the mouth of the can, since otherwise the material would not readily pass through the mouth of the can. The machine comprises mechanism for forcing the material through the hoppers, consisting of a series of contractible plungers H, one for each hopper. These plungers are mounted to rotate with the table D on which the cans are rotated, so that during rotation of the table, one hopper will be receiving a charge while the plunger of another is being operated to displace the material into the can, and while a filled can is being discharged from the table D, so that the filling operations may follow in rapid succession and the operation of the machine will be substantially continuous and will have great capacity. Since each of the hoppers of the series (four being shown) and the contractible plungers for forcing the charge from the hoppers, are of like construction, a description of one will suffice for all.

Figures 7, 8:
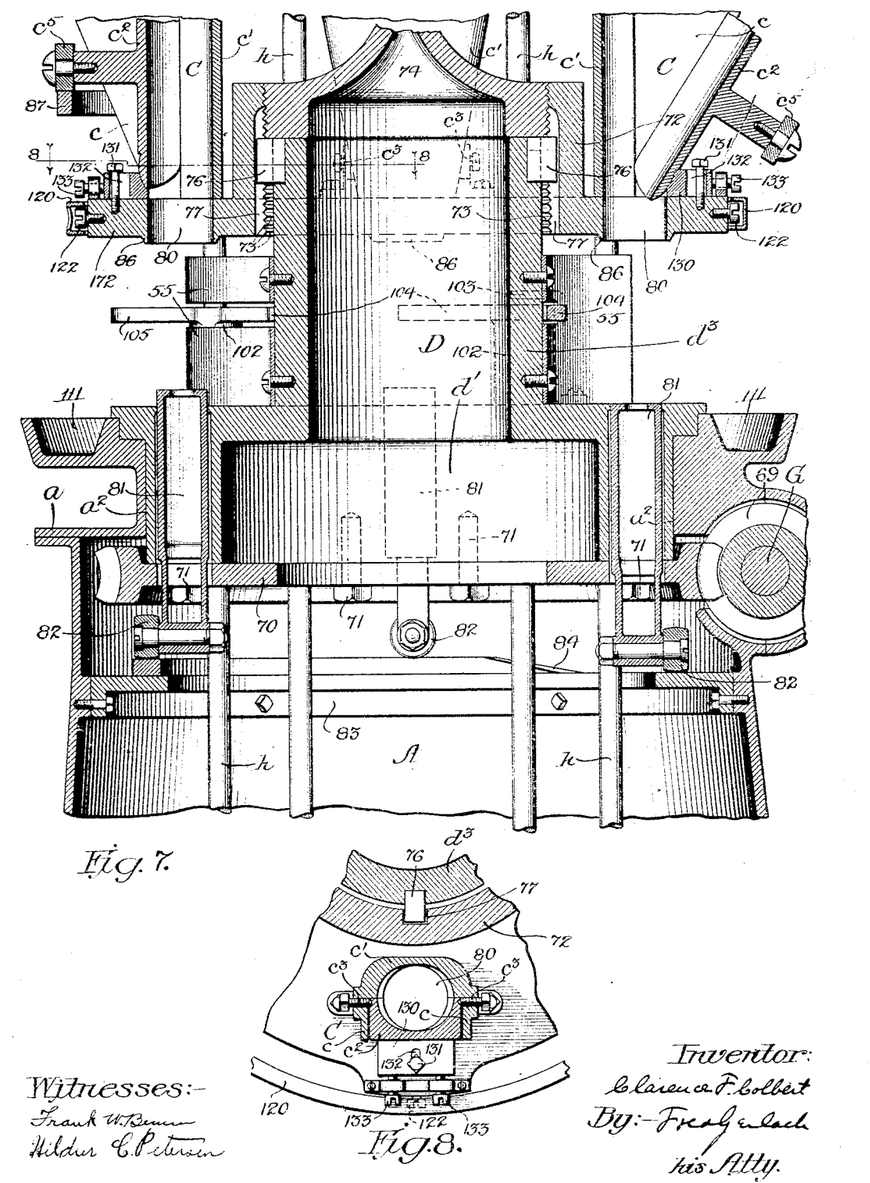
Fig. 7 is a central vertical section through the rotating table and adjacent parts upon an enlarged scale.
Fig. 8 is a horizontal section on line 8—8 of Fig. 7.
Figure 9:
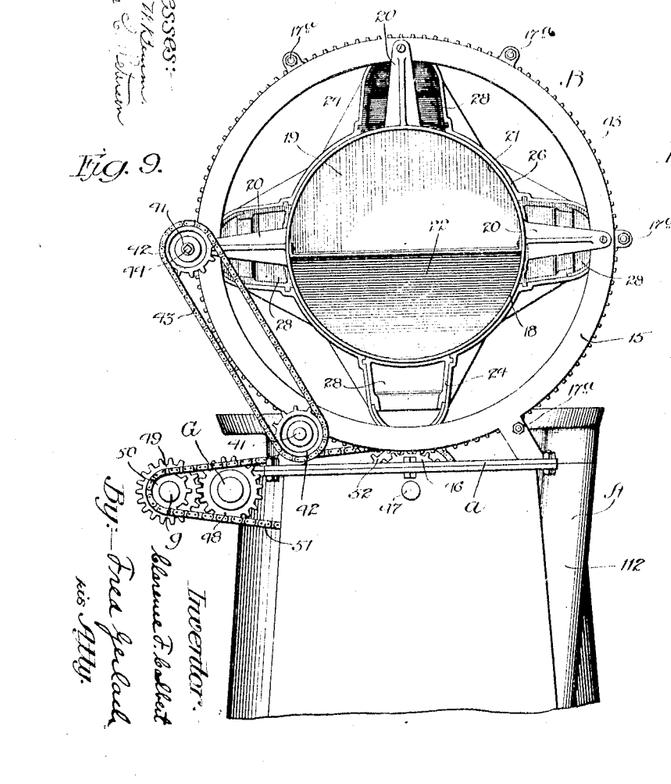
Fig. 9 is a front elevation of the delivery mechanism for delivering material in measured quantity to the hoppers.
Figure 9A:
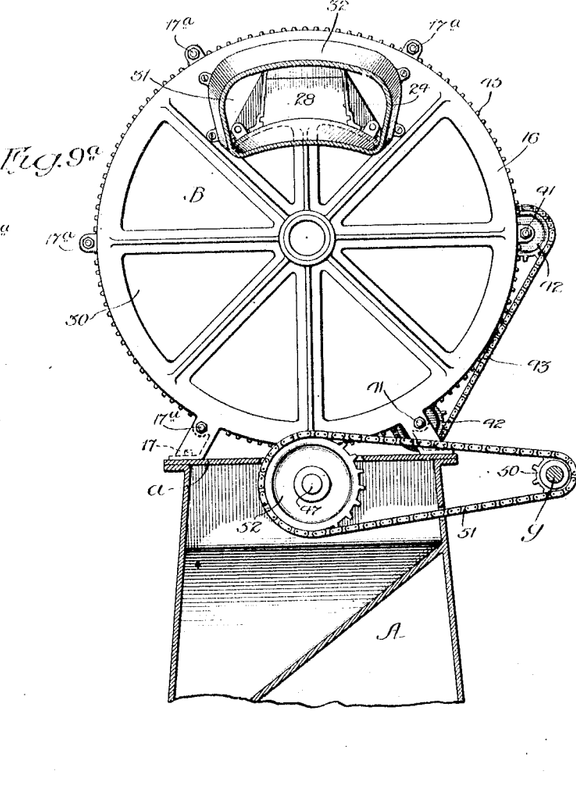
Figure 13:
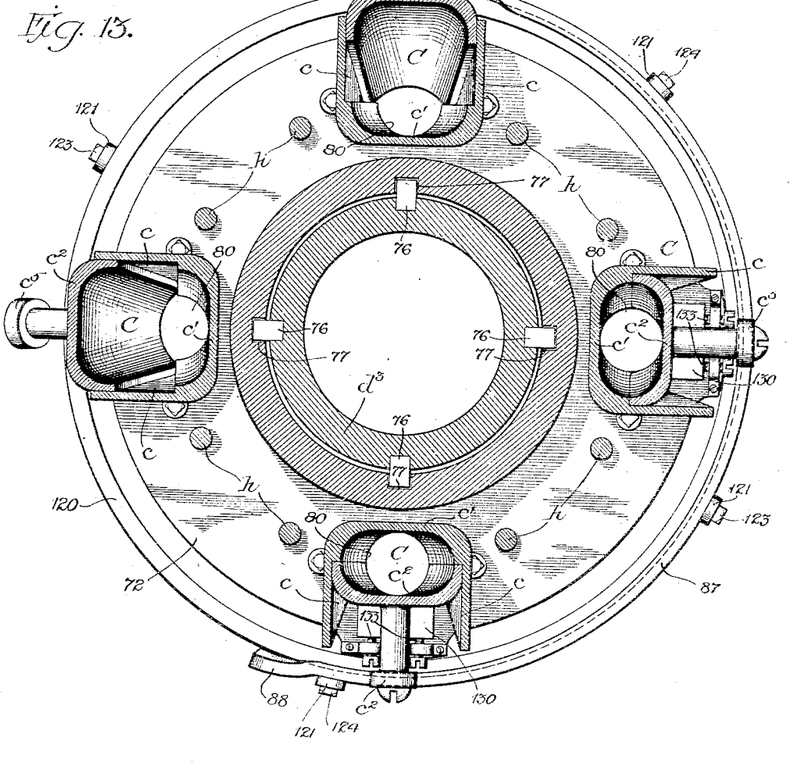
Fig. 13 is a plan of the rotating table, the hoppers being shown in section.
Figure 14:
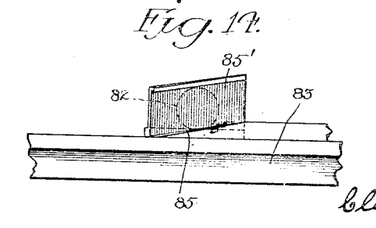
Fig. 14 is a detail view of the cam for lowering the can feeding plungers.
Figures 15, 16, 17, 18:
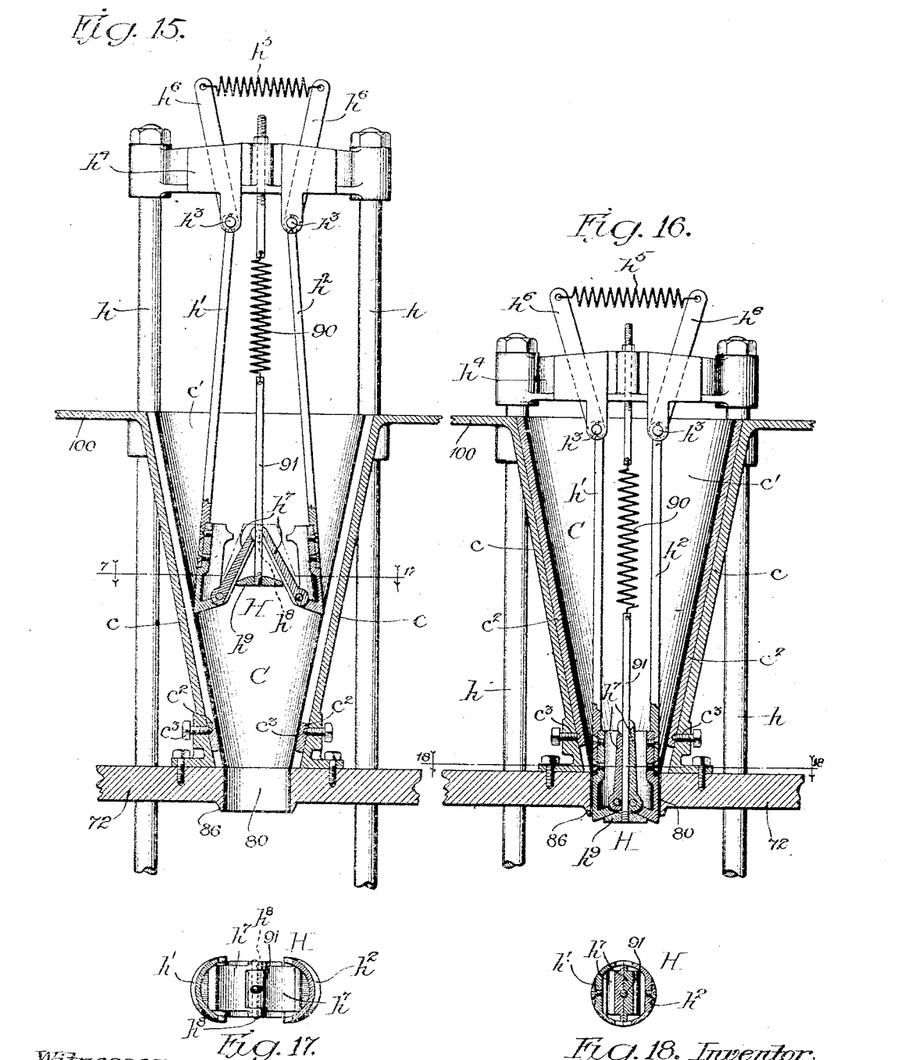
Fig. 15 is a vertical section through one of the hoppers, the collapsible plunger being shown in partially lowered position.
Fig. 16 is a similar view, the plunger being shown completely lowered.
Fig. 17 is a section of the plunger on line 17—17 of Fig. 15.
Fig. 18 is a section of the plunger taken on line 18—18 of Fig. 16.

Each hopper C comprises inwardly sloping side-walls $c$, a back-wall $c'$, and a movable wall $c^2$, which is pivoted at its lower end, by screws $c^3$ to the lower portion of the side-walls of the hoppers (Figs. 7 and 8). The pivoted hopper-wall $c^2$ swings outwardly, so an enlarged opening will be provided at its upper end to receive a charge of material from the delivery-mechanism, while the hoppers are being rotated. Each pivoted hopper wall $c^2$ is provided with a roller $c^5$ which is adapted to travel on a stationary track or guide 87 which is provided with a cam-terminal 88 (Fig. 13) in the path of travel of the rollers $c^5$ to swing the guides into position to close the hoppers after they have received a charge of material, and the straight portion of guide 87 holds the roller in position to cause the pivoted hopper wall to remain closed until the material has been discharged from the hopper. Track 87 being stationary, the hoppers in rotating cause the pivoted walls thereof to be operated. When the pivoted hopper-wall $c^2$ has been swung inwardly, it will be in parallel relation to the opposite or back wall of the hopper and the side-walls of the hopper are flared or inclined upwardly so that the material being forced therethrough, will be compressed in transit to the can and so that it will be forced through the reduced lower hopper-end and discharge-opening 80, through the mouth of the can.

The hopper-supporting-ring 72 is held against upward movement by a ring 120, which is secured to standards 121, which are secured to the frame A and screws 122 in ring 72 fit and ride in a channel formed in ring 120. In order to permit the ring 120 to be adjusted with the hoppers and hopper-supporting ring, it is connected by bolt-and-slot connections 123 to standards 121. Three of the latter serve to support the track 87 which controls the operation of the pivoted walls of the hopper and this track, and in order to permit it to be adjusted vertically with the hoppers, is connected to said standards by bolt-and-slot connections 124. By loosening the bolts or connections 123 and 124, said ring will be adjusted vertically with the hopper-supporting ring and the track 87 may be set to properly operate the pivoted hopper walls. A stop 130 is adjustably connected to the hopper-supporting ring adjacent the lower end of each pivoted hopper-wall $c^2$, being connected thereto by a bolt 131 and slot 132 and a pair of screws 133 serve to shift the stop to limit its outward movement (Figs. 7 and 8).

An expansible and contractible plunger H is provided for each hopper, which is adapted to fit in the flared hopper and to be contracted thereby, so that the entire charge of material in the hopper will be forced into the can. These plungers are mounted to rotate with the table and the hoppers, being carried and operated by a pair of rods $h$ which are guided vertically in the rotating table D. Each plunger comprises a pair of members $h'$, $h^2$ each of which is pivoted at its upper end, as at $h^3$, to a cross-head $h^4$ secured to the upper ends of each pair of plunger-rods $h$. The plunger-members are movable laterally relatively to one another and are normally pressed apart or yieldingly held in separated relation, by a spring $h^5$, which is connected to the upper ends of arms $h^6$ extending upwardly from members $h'$ and $h^2$. The lower ends of members $h'$ and $h^2$ form the outer sections of a collapsible plunger-head. To each of these head-sections is pivoted a link-section $h^7$, and the inner ends of these link-sections are pivotally connected to each other, as at $h^8$. These links, together with the lower ends of members $h'$ and $h^2$, form a collapsible head which, as it is operated through the hopper, adjusts itself to fit between the inclined walls thereof and to form a closure which confines the material beneath the plunger and forces it through the hopper into the can. A supplemental head $h^9$ is yieldingly suspended from the cross-head by a spring 90 and a rod 91 and this supplemental head is adapted to pass between the link-sections $h'$ $h^2$ of the plunger-head as they are being folded, to prevent the solid material from packing between the link-sections. Spring 90 permits this supplemental head to pass beneath the lower ends of members $h'$, $h^2$ when the link-sections are folded together and the head keeps the space between the link-sections clear. The peculiar hopper and contractible plunger, per se are not claimed herein, since they form the subject-matter of an application heretofore filed by me.

Figure 10:
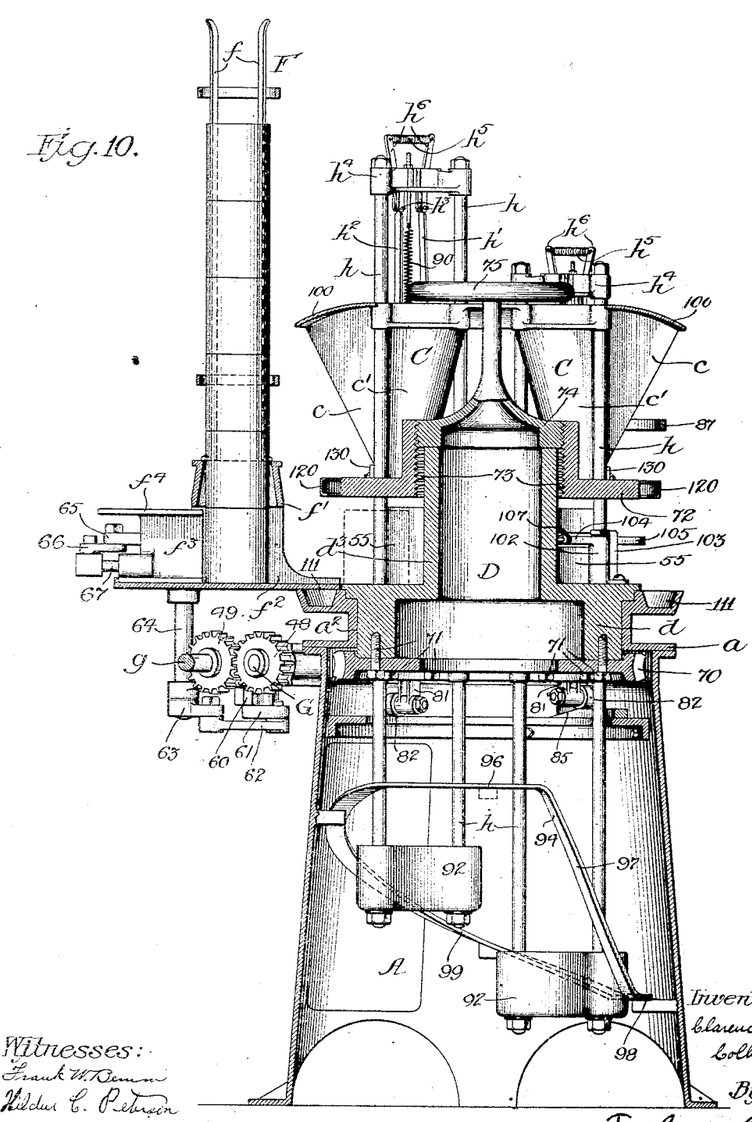
Fig. 10 is a vertical section taken on line 10—10 of Fig. 4, parts being shown in elevation.

In the operation of the machine, the plungers H are in raised position (Fig. 2) when the hoppers are receiving a charge of material from the delivery mechanism, to facilitate delivery of the charge into the hopper. As soon as each hopper has been filled, the continuously rotating table D will move the hoppers away from the delivery-spout of the delivery-mechanism and the pivoted-wall $c^2$ will be swung inwardly by the engagement of rollers $c^5$ with the guide 87. The rods $h$ for each hopper extend through the rotating table and have connected to their lower ends, a weight 92, which serves to lower the plungers in the hoppers and to operate them to force the material from the hoppers into the can beneath it. Each weight 92 is provided with a roller 93 (Figs. 2 and 10) which is adapted to ride on a track 94 in the frame A, to control the lowering operation of the plunger and to lift it, as it is rotated. Track 94 is elevated, as at 96 (Fig. 2) so that as the hoppers are rotated into position to successively receive charges, collapsible plungers H will be raised to facilitate reception of the charge by the hopper, and this track is inclined, as at 97, so that after each hopper has received a charge and its pivoted wall $c^2$ has been swung inwardly, the plunger-weight 92 will operate the plunger through the hopper to force the material from the hopper into the can. The track is also provided with a straight lower portion 98 and with an upwardly sloping portion 99, on which the weight-studs 93 ride to operate the weights and plungers upwardly after the cans have been filled, and to retain the plunger in elevated position before each hopper is brought into position to receive another charge. Between the tops of the hoppers is formed a wall 100 which is adapted to close the lower end of the delivery-spout 32 to hold the material in the spout until the hoppers are successively brought into position to receive the material from the spout. When the hoppers are raised or lowered, a spout 32 of sufficient length to extend to wall 100 will be substituted. After each can has been filled, it is removed from the table D onto a discharge table 101. This removal is accomplished by discharge-lever 102 (Fig. 3), one of which is provided beneath each hopper. Each discharge-lever is pivoted for convenience, on one of the plunger-rods $h$, being held in position relatively to the table by a bracket 103, and comprises an arm 104 disposed to sweep the cans from table D onto table 101; and an arm 105 adapted to engage a stationary abutment 106 on the bed $a$, which operates the levers to sweep the cans from the table D onto the table 101. A spring 107 is provided for each of the discharge levers to hold them in normal position and to retract them after each discharging operation. Table 101 is mounted on the upper end of a vertical shaft 108 which is suitably journaled on the bed, and a worm-gear 109 secured to said shaft is driven by a worm 110 on the counter-shaft $g$, so that the discharge table 101 will be continuously driven to remove the filled cans.

The bed or table A is preferably provided with an annular trough 111 disposed around the rotating table and to catch any overflow. A duct 112 carries off the material from the trough to a suitable collector which may be placed in the frame A, if desired.

The operation of the filling machine will be as follows: Tomatoes in bulk will be conducted into the drum 18, cans will be delivered into the can-guide F, and continuous movement will be imparted to the main-shaft G by a pulley $g^4$ which will be driven from a suitable source of power, a lever $g^5$ and clutch $g^6$ of any suitable construction being provided for controlling the operation of the machine. The main-drive-shaft G will impart continuous rotary movement to the table D and the hoppers carried thereby, by means of worm-wheel 69 and gear-ring 70 and will also drive the delivery-mechanism by means of gears 48 and 49, counter-shaft $g$, sprocket-wheel 50, chain 51, sprocket-wheel 52, shaft 47, gear 46 and gear-ring 45 secured to the rotating receptacles of the delivery-mechanism. In rotating these receptacles, they will successively receive charges of material when in their lowered position and as they rotate upwardly, their plungers 28 will compress the charges, knife 33 will sever the excess material from that in rotating receptacles 24. When the latter arrive at their uppermost position, their plungers 28 will eject the measured charges through spout 32 into one of the hoppers. The delivery mechanism is timed to deliver a charge into each hopper, as it is brought into position to receive a charge beneath spout 32. Before the hoppers reach their receiving position, the can-feeding plunger $f^3$ will successively feed cans onto the table beneath the hoppers and the cans will be properly positioned and held beneath the hopper by their plunger 81 respectively. Feed-plunger $f^3$ will be operated by (Fig. 5) worm-wheel 57, gear-wheel 58, shaft 59, crank 61, link 62, arm 63, shaft 64, arm 65 and link 66. In rotating, the hoppers will successively pass beneath and away from the delivery-spout 32, and their pivoted walls $c^2$ will be swung inwardly by engagement of rollers $c^5$ and track 87. The collapsible weight-operated plungers H will be operated through the hoppers to force the charges therein through the discharge-openings 80 into the cans, the lowering operations being controlled by incline 97 of track 94. After the cans have been filled, the collapsible plungers will be raised out of the cans by the cam-portion 99 of track 94 on which the weight-rollers 93 rides, so that the cans may be removed from the rotating table D. During the lifting operation of the plunger, the can lifting plungers 81 will be successively lowered to release the can. After the cans have been released, the discharge-levers 102 rotating with the table D and the cans, will be struck by abutment 106 and arms 104 of the discharge-levers will successively sweep the can from the rotating table D onto the discharge-table 101. This cycle of operations proceeds continuously, so that all of the hoppers and associated mechanisms are operating to continuously fill cans. This resulting in speedy operation and adapts the machine for rapid work.

The invention thus provides an improved filling machine, which is adapted for filling cans with tomatoes or vegetables, and which has a great capacity.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In a filling-machine, the combination of a plurality of movably mounted receptacles, means for delivering material in bulk to the receptacles, mechanism for operating the receptacles, plungers mounted to slide in the receptacles in a plane transverse to the plane of the movement of the receptacles, means for operating the plungers to compress the material in the receptacles, means for cutting the excess material from that in the receptacles, so the excess will remain in the delivery-means, and means for operating the plungers to discharge the material from the receptacles.

2. In a filling-machine, the combination of a plurality of rotatably mounted receptacles, means for delivering material to the receptacles, mechanism for rotating the receptacles, plungers mounted in the receptacles and to slide therein in a plane transverse to the plane of rotation of the receptacles, means for operating the plungers to compress the material in the receptacles, means for severing the excess material from that in the receptacles when the material is compressed, and means for operating the plungers to discharge the material from the receptacles.

3. In a filling-machine, the combination of a plurality of rotatable receptacles, means for delivering material to the receptacles, mechanism for rotating the receptacles, plungers slidable in the receptacles, means for severing the excess material from that in the receptacles, and mechanism for operating the plungers to compress the material before the severing means becomes operative upon a charge in the receptacle, and to force the material from the receptacles.

4. In a filling machine, the combination of a drum for containing a supply of material, a plurality of receptacles mounted to rotate around the drum, mechanism for rotating the receptacles, the drum having an opening therein for the passage of material to the receptacles, means for compressing the material in the receptacles, means for varying the quantity of material in said receptacles, and a knife for severing the material in the receptacles from that in the drum.

5. In a filling machine, the combination of a drum for containing a supply of material, a plurality of receptacles mounted to rotate around the drum, mechanism for rotating the receptacles, the drum having an opening therein for the passage of material to the receptacles, means for varying the quantity of material received by said receptacles from the drum, a knife for severing the material in the receptacles from that in the drum, and plungers for ejecting the material from the receptacles.

6. In a filling machine, the combination of a drum for a supply of material, a plurality of receptacles mounted to rotate around the drum, mechanism for rotating the receptacles, the drum having an opening therein for the passage of material to the receptacles, and a knife for severing the material in the receptacles from that in the drum.

7. In a filling machine, the combination of a drum for containing a supply of material, a plurality of receptacles mounted to rotate around the drum, mechanism for rotating the receptacles, the drum having an opening therein for the passage of material to the receptacles, means for compressing the material in the receptacles, and a knife for severing the material in the receptacles from that in the drum.

8. In a filling machine, the combination of a drum for containing a supply of material, a plurality of receptacles mounted to rotate around the drum, mechanism for rotating the receptacles, the drum having an opening therein for the passage of material to the receptacles, a knife for severing the material in the receptacles from that in the drum, and means for ejecting the material from the receptacles.

9. In a filling machine, the combination of a drum for containing a supply of material, a plurality of receptacles mounted to rotate around the drum, mechanism for rotating the receptacles, the drum having an opening therein for the passage of material to the receptacles, a knife for severing the material in the receptacles from that in the drum, and means for ejecting the material from the receptacles.

10. In a filling machine, the combination of a drum for containing a supply of material, a plurality of receptacles mounted to rotate around the drum, the drum having an opening for the passage of material into the receptacles, plungers in the receptacles, mechanism for rotating the receptacles, and means for operating the plungers in the receptacles.

11. In a filling machine, the combination of a drum for containing a supply of material, a plurality of receptacles mounted to rotate around the drum, the drum having an opening for the passage of material into the receptacles, plungers in the receptacles, mechanism for rotating the receptacles and plungers, means for operating the plungers in the receptacles, and means for severing the material in the receptacles from that in the drum.

12. In a filling machine, the combination of a drum for containing a supply of material, a plurality of receptacles mounted to rotate around the drum, the drum having an opening for the passage of material into the receptacles, plungers in the receptacles, mechanism for rotating the receptacles and plungers, and cams for operating the plungers in the receptacles.

13. In a filling machine, the combination of a drum for containing a supply of material, a plurality of receptacles mounted to rotate around the drum, the drum having an opening for the passage of material into the receptacles, plungers in the receptacles, mechanism for rotating the receptacles and plungers, cams for operating the plungers in the receptacles, and means for severing the material in the receptacles from that in the drum.

14. In a filling machine, the combination of a drum for containing a supply of material, a plurality of receptacles mounted to rotate around the drum, the drum having an opening for the passage of material into the receptacles, plungers in the receptacles, mechanism for rotating the receptacles and plungers, and means for operating the plungers in the receptacles comprising an adjustable cam.

15. In a filling machine, the combination of a drum for containing a supply of material, a plurality of receptacles mounted to rotate around the drum, the drum having an opening for the passage of material into the receptacles, plungers in the receptacles, mechanism for rotating the receptacles and plungers, means for operating the plungers in the receptacles, comprising an adjustable cam, and means for severing the material in the receptacles from that in the drum.

16. In a filling machine, the combination of a plurality of hoppers mounted to rotate horizontally, each provided with a movable wall, means for delivering material to the hoppers, mechanism for rotating the hoppers, means for operating the movable walls of the rotating hoppers, and mechanism for forcing material from the hoppers into the receptacles to be filled.

17. In a filling machine, the combination of a plurality of hoppers mounted to rotate horizontally, each provided with a movable wall, mechanism for continuously rotating the hoppers, means for operating the movable walls of the rotating hoppers, and mechanism for forcing material from the hoppers.

18. In a filling machine, the combination of a plurality of hoppers mounted to rotate horizontally, each provided with a pivoted wall, means for delivering material to the hoppers, mechanism for continuously rotating the hoppers, means for operating the pivoted walls of the rotating hoppers, and mechanism for forcing material from the hoppers.

19. In a filling machine, the combination of a plurality of hoppers mounted to rotate horizontally, each provided with a movable wall, means for delivering material to the hoppers, mechanism for rotating the hoppers, means for operating the movable walls of the rotating hoppers, and mechanism rotating with the hoppers for forcing material from the hoppers.

20. In a filling machine, the combination of a plurality of hoppers mounted to rotate horizontally, each provided with a movable wall, means for delivering material to the hoppers, mechanism for continuously rotating the hoppers, means for operating the movable walls of the rotating hoppers, and mechanism mounted to rotate with the hoppers for forcing material from the hoppers into the receptacles to be filled.

21. In a filling machine, the combination of a plurality of hoppers mounted to rotate horizontally, each provided with a pivoted wall, mechanism for rotating the hoppers, means for operating the pivoted walls of the rotating hoppers, and mechanism rotating with the hoppers, for forcing material from the hoppers.

22. In a filling machine, the combination of a plurality of hoppers mounted to rotate horizontally, each provided with a pivoted wall, means for delivering material to the hoppers, mechanism for continuously rotating the hoppers, means for operating the pivoted walls of the rotating hoppers, and mechanism rotating with the hoppers, for forcing material from the hoppers.

23. In a filling machine, the combination of a plurality of rotatable hoppers, each provided with a movable wall, means for delivering material to the hoppers, mechanism for rotating the hoppers, a stationary track for operating the movable walls of the rotating hoppers, and mechanism for forcing material from the hoppers into the receptacles.

24. In a filling machine, the combination of a plurality of rotatable hoppers, each provided with a movable wall, mechanism for continuously rotating the hoppers, a stationary track for operating the movable walls of the rotating hoppers, and mechanism for forcing material from the hoppers into the receptacles.

25. In a filling machine, the combination of a plurality of rotatable hoppers, each provided with a pivoted wall, mechanism for rotating the hoppers, a stationary track for operating the pivoted walls of the rotating hoppers, and mechanism for forcing material from the hoppers into the receptacles.

26. In a filling machine, the combination of a plurality of rotatable hoppers, each provided with a movable wall, means for delivering material to the hoppers, mechanism for rotating the hoppers, a stationary track for operating the movable walls of the rotating hoppers, and mechanism rotating with the hoppers, for forcing material from the hoppers.

27. In a filling machine, the combination of a plurality of hoppers mounted to rotate horizontally, a plurality of vertically movable measuring devices for delivering material to said hoppers, mechanism for operating the measuring devices vertically to successively deliver charges into the hoppers, and reciprocable plungers rotating with the hoppers, for forcing the material from the hoppers into the receptacles to be filled.

28. In a filling machine, the combination of a plurality of hoppers mounted to rotate horizontally, a plurality of vertically rotatable measuring devices for delivering material to the hoppers, mechanism for vertically rotating said receptacles to successively deliver the charges into the hoppers, and plungers rotating with the hoppers for forcing the material from the hoppers into the receptacles to be filled.

29. In a filling machine, the combination of a plurality of hoppers mounted to rotate horizontally, a plurality of vertically rotatable measuring devices for delivering material to the hoppers, mechanism for vertically rotating said receptacles to successively deliver charges into the hoppers, plungers on said receptacles for discharging the material therefrom, and plungers rotating with the hoppers for forcing the material from the hoppers into the receptacles to be filled.

CLARENCE F. COLBERT.

Witnesses:
 HOMER C. STEWART,
 PERRY D. HART.